US012071935B1

(12) United States Patent
Sheikh et al.

(10) Patent No.: US 12,071,935 B1
(45) Date of Patent: Aug. 27, 2024

(54) VERTICAL WIND TURBINE ASSEMBLY (71) Applicants: Ajaz Sheikh, Irvine, CA (US); Rizwan Malik, Irvine, CA (US)

(72) Inventors: Ajaz Sheikh, Irvine, CA (US); Rizwan Malik, Irvine, CA (US)

(*) Notice: Subject to any disclaimer, the term of this patent is extended or adjusted under 35 U.S.C. 154(b) by 0 days.

(21) Appl. No.: 18/199,737

(22) Filed: May 19, 2023

(51) Int. Cl.
F03D 7/06 (2006.01)
F03D 9/25 (2016.01)
F03D 15/00 (2016.01)
H02K 7/18 (2006.01)

(52) U.S. Cl.
CPC .............. F03D 7/06 (2013.01); F03D 9/25 (2016.05); F03D 15/00 (2016.05); H02K 7/183 (2013.01); F05B 2220/706 (2013.01); F05B 2240/211 (2013.01); F05B 2270/321 (2013.01)

(58) Field of Classification Search
CPC .............. F03D 7/06; F03D 9/25; F03D 15/00; H02K 7/183; F05B 2240/211; F05B 2270/321
See application file for complete search history.

(56) References Cited

U.S. PATENT DOCUMENTS

| | | | | |
|---|---|---|---|---|
| 244,677 A * | 7/1881 | Sherwood | ............... | F03D 3/00 416/117 |
| 346,797 A * | 8/1886 | Aylsworth | ............... | F03D 3/02 416/117 |
| 354,972 A * | 12/1886 | Dodds | ............... | F03D 3/00 416/118 |
| 1,915,689 A * | 6/1933 | Moore | ............... | F03D 3/067 415/141 |
| 2,170,911 A * | 8/1939 | Raulerson | ............... | F03D 3/068 290/55 |
| 4,377,372 A * | 3/1983 | Stutzman | ............... | F03D 3/067 416/197 A |
| 5,118,255 A * | 6/1992 | Moreno | ............... | F03B 17/065 416/140 |
| D342,074 S | 12/1993 | Burns | | |
| 5,570,997 A * | 11/1996 | Pratt | ............... | F03D 3/067 416/142 |
| 6,682,302 B2 * | 1/2004 | Noble | ............... | F03D 3/068 416/197 R |
| 8,282,350 B2 * | 10/2012 | Corrado | ............... | F03D 3/067 415/4.4 |

(Continued)

FOREIGN PATENT DOCUMENTS

WO WO-2009153772 A1 * 12/2009 ............. F03D 3/068
WO WO2020110133 6/2020

Primary Examiner — Tulsidas C Patel
Assistant Examiner — Thomas K Quigley (57) ABSTRACT A vertical wind turbine assembly includes a base positioned on the ground in an area known to experience windy conditions. A generator is positioned within the base and a shaft is mechanically coupled to the generator. A plurality of arms radiates outwardly from the shaft and a plurality of sets of blades is pivotally attached to a respective one of the plurality of arms. Each of the sets of blades is positionable in a deployed position or a stored position. A plurality of actuators is coupled between a respective one of the plurality of arms and a respective one of the plurality of sets of blades. A wind direction sensor is integrated into the shaft to indicate a direction of the wind. Each of the plurality of actuators is actuated to urge the respective blades between the deployed position and the stored position depending on the direction of wind.

7 Claims, 6 Drawing Sheets (56) References Cited

U.S. PATENT DOCUMENTS

| | | | |
|---|---|---|---|
| 8,382,435 B2* | 2/2013 | Deeley | F03D 3/068 |
| | | | 415/4.4 |
| 8,779,620 B1* | 7/2014 | Mele | F03D 3/02 |
| | | | 290/55 |
| 9,377,006 B2* | 6/2016 | Dulcetti Filho | F03D 3/068 |
| 10,473,089 B2* | 11/2019 | Mobaraki | F03D 7/041 |
| 2004/0265127 A1* | 12/2004 | Noble | F03D 3/068 |
| | | | 416/1 |
| 2008/0075594 A1* | 3/2008 | Bailey | F03D 3/068 |
| | | | 416/104 |
| 2012/0121380 A1* | 5/2012 | Tein | H02K 7/1876 |
| | | | 415/4.2 |
| 2013/0039761 A1* | 2/2013 | Dulcetti Filho | F03D 3/068 |
| | | | 416/3 |
| 2014/0050583 A1* | 2/2014 | Wang | F03D 3/068 |
| | | | 416/98 |
| 2018/0142673 A1 | 5/2018 | Wu | |
| 2020/0072190 A1 | 3/2020 | Buchanan | |
| 2020/0132044 A1 | 4/2020 | Chung | |
| 2021/0348593 A1 | 11/2021 | Ethiraj | |

* cited by examiner

VERTICAL WIND TURBINE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wind turbine devices and more particularly pertains to a new wind turbine device for converting wind energy into electrical energy. The device includes a wind turbine that is vertically oriented and which includes blades that are pivotable between a deployed position and a stored position and a wind direction sensor. The blades are pivoted in the deployed position when the blades are perpendicular to the wind to capture the wind and the blades are positioned in the stored position while the blades are not perpendicular to the wind.

(2) Description of Related Art Including Information Disclosed Under 37 CFR 1.97 and 1.98

The prior art relates to wind turbine devices which includes a wide variety of vertically oriented wind turbines, each of which includes either a plurality of fixed blades or a plurality of pivotable blades that can be adjusted to a variety of angles to maximize efficiency of the pivotable blades. In no instance does the prior art disclose a vertical wind turbine that includes pivotable blades that are in a deployed position when the pivotable blades are perpendicular to the direction of wind and a stored position when the pivotable blades are not perpendicular to the direction of wind.

BRIEF SUMMARY OF THE INVENTION

An embodiment of the disclosure meets the needs presented above by generally comprising a base positioned on the ground in an area known to experience windy conditions. A generator is positioned within the base and a shaft is mechanically coupled to the generator. A plurality of arms radiates outwardly from the shaft and a plurality of sets of blades is pivotally attached to a respective one of the plurality of arms. Each of the sets of blades is positionable in a deployed position or a stored position. A plurality of actuators is coupled between a respective one of the plurality of arms and a respective one of the plurality of sets of blades. A wind direction sensor is integrated into the shaft to indicate a direction of the wind. Each of the plurality of actuators is actuated to urge the respective blades between the deployed position and the stored position depending on the direction of wind.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new wind turbine device embodying the principles and concepts of an embodiment of the disclosure and generally designated by the reference numeral 10 will be described.

As best illustrated in FIGS. 1 through 7, the vertical wind turbine assembly 10 generally comprises a base 12 that is positioned on the ground in an area known to experience windy conditions. The base 12 has an outer surface 14 that is continuously arcuate about a center point such that the base 12 has a cylindrical shape. A generator 16 is positioned within the base 12 and the generator 16 has a drive input 18. The generator 16 may be an electrical generator of any conventional design that is commonly employed in the wind turbine industry for converting wind energy into electrical energy. A shaft 20 is rotatably attached to the base 12 and the shaft 20 is mechanically coupled to the generator 16. The shaft 20 extends through a hole 22 in an upper wall 24 of the base 12 such that the shaft 20 is vertically oriented on the base 12 and a lower end 26 of the shaft 20 is coupled to the drive input 18 of the generator 16.

A plurality of couplings 28 is provided and each of the plurality of couplings 28 is attached to an outer surface 30 of the shaft 20. The couplings 28 are evenly spaced apart from each other and are distributed around a full circumference of the outer surface 30. Furthermore, the couplings 28 are positioned closer to an upper end 32 of the shaft 20 than the upper wall 24 of the base 12 and each of the couplings 28 has a well 34 which extends into a distal end 36 of the couplings 28. A plurality of arms 38 is each attached to the shaft 20 having the plurality of arms 38 radiating outwardly from the shaft 20. Each of the arms 38 extends into the well 34 in the distal end 36 of a respective one of the couplings 28 on the outer surface 30 of the shaft 20.

A plurality of sets of blades 40 is provided and each of the sets of blades 40 is pivotally attached to a respective one of the plurality of arms 38. Each of the sets of blades 40 is positionable in a deployed position having each of the sets of blades 40 angling away from the respective arm 38 in opposing directions from each other. In this way each of the sets of blades 40 on each of the plurality of arms 38 can capture wind for rotating the shaft 20 thereby turning the generator 16. Each of the sets of blades 40 is positionable in a stored position having the sets of blades 40 lying flat against each other. In this way each of the sets of blades 40 is inhibited from capturing the wind thereby facilitating the shaft 20 to remain motionless.

Each of the sets of blades 40 has a coupled edge 42, a free edge 44, a first lateral edge 46, a second lateral edge 48 and a lower surface 50; the first lateral edge 46 has a length that is greater than a length of the second lateral edge 48. The coupled edge 42 of each of the sets of blades 40 is pivotally attached to an exterior surface 52 of the respective arm 38 having each of the sets of blades 40 extending along a substantial length of the respective arm 38. The coupled edge 42 of each of the sets of blades 40 is positioned on opposing sides of the exterior surface 52 of the respective arm 38 from each other. The first lateral edge 46 of each of the sets of blades 40 is positioned adjacent to a respective one of the couplings 28 and the second lateral edge 48 of each of the sets of blades 40 is positioned adjacent to a distal end 54 of the respective arm 38. As most clearly shown in FIGS. 1 and 2, the lower surface 50 of each of the blades 40 is textured with a plurality of ridges 56 extending between the first lateral edge 46 and the second lateral edge 48 to increase the overall surface area of the lower surface 50. In this way the efficiency of the plurality of blades 40 to capture wind energy is increased. Furthermore, the lower surface 50 of each of the blades 40 has a lip 58 which extends around an entire perimeter of the lower surface 50 to further capture wind that strikes the lower surface 50.

A plurality of actuators 60 is provided and each of the plurality of actuators 60 is coupled between a respective one of the plurality of arms 38 and a respective one of the plurality of sets of blades 40. Each of the plurality of actuators 60 urges the respective sets of blades 40 between the deployed position and the stored position. Additionally, each of the plurality of actuators 60 includes a pivot 62 and a pair of pistons 64 each attached to the pivot 62. The pivot 62 associated with each of the actuators 60 is attached to the exterior surface 52 of the respective arm 38 and each of the pair of pistons 64 extends between the pivot 62 and the lower surface 50 of the respective blade 40. Each of the pistons 64 shortens to urge the respective set of blades 40 into the stored position and each of the pistons 64 lengthens to urge the respective set of blades 40 into the deployed position.

A wind direction sensor 66 is integrated into the shaft 20 such that the wind direction sensor 66 is exposed to wind. The wind direction sensor 66 is rotated to indicate a direction of the wind and the wind direction sensor 66 is in communication with each of the plurality of actuators 60. Each of the plurality of actuators 60 is actuated to urge the respective blades 40 between the deployed position and the stored position depending on the direction of wind. The wind direction sensor 66 comprises a pole 68 that is rotatably disposed on the upper end 32 of the shaft 20 and a position sensor 70 attached to the pole 68 such that the position sensor 70 is positioned within the shaft 20. Additionally, the wind direction sensor 66 includes a flag 72 that is attached to the pole 68 to capture the wind thereby rotating the pole 68. The flag 72 is comprised of a rigid material thereby inhibiting the flag 72 from deforming due to the force of the wind.

The wind direction sensor 66 includes a plurality of rotation sensors 74 that is each integrated into the shaft 20 and each of the rotation sensors 74 is aligned with a respective one of the arms 38. Additionally, each of the plurality of rotation sensors 74 passes next to the position sensor 70 as the shaft 20 rotates. The position sensor 70 and each of the plurality of rotation sensors 74 may comprise magnetic sensors which can remotely interact with each other without producing friction. The wind direction sensor 66 includes a control circuit 76 that is integrated into the shaft 20 and the control circuit 76 is electrically coupled to the each of the plurality of rotation sensors 74. The control circuit 76 is electrically coupled each of the pistons 64 associated with each of the actuators 60 and a power source 79. Each of the pistons 64 associated with the plurality of actuators 60 associated with a respective one of the arms 38 is actuated into the lengthened condition when the rotation sensor 74 associated with the respective arm 38 moves within a pre-determined distance of the position sensor 70. Conversely, each of the pistons 64 associated with each of the actuators 60 associated with the respective arm 38 is actuated into the shortened condition when the rotation sensor 74 associated with the respective arm 38 moves beyond the pre-determined distance of the position sensor 70.

Figure 1:
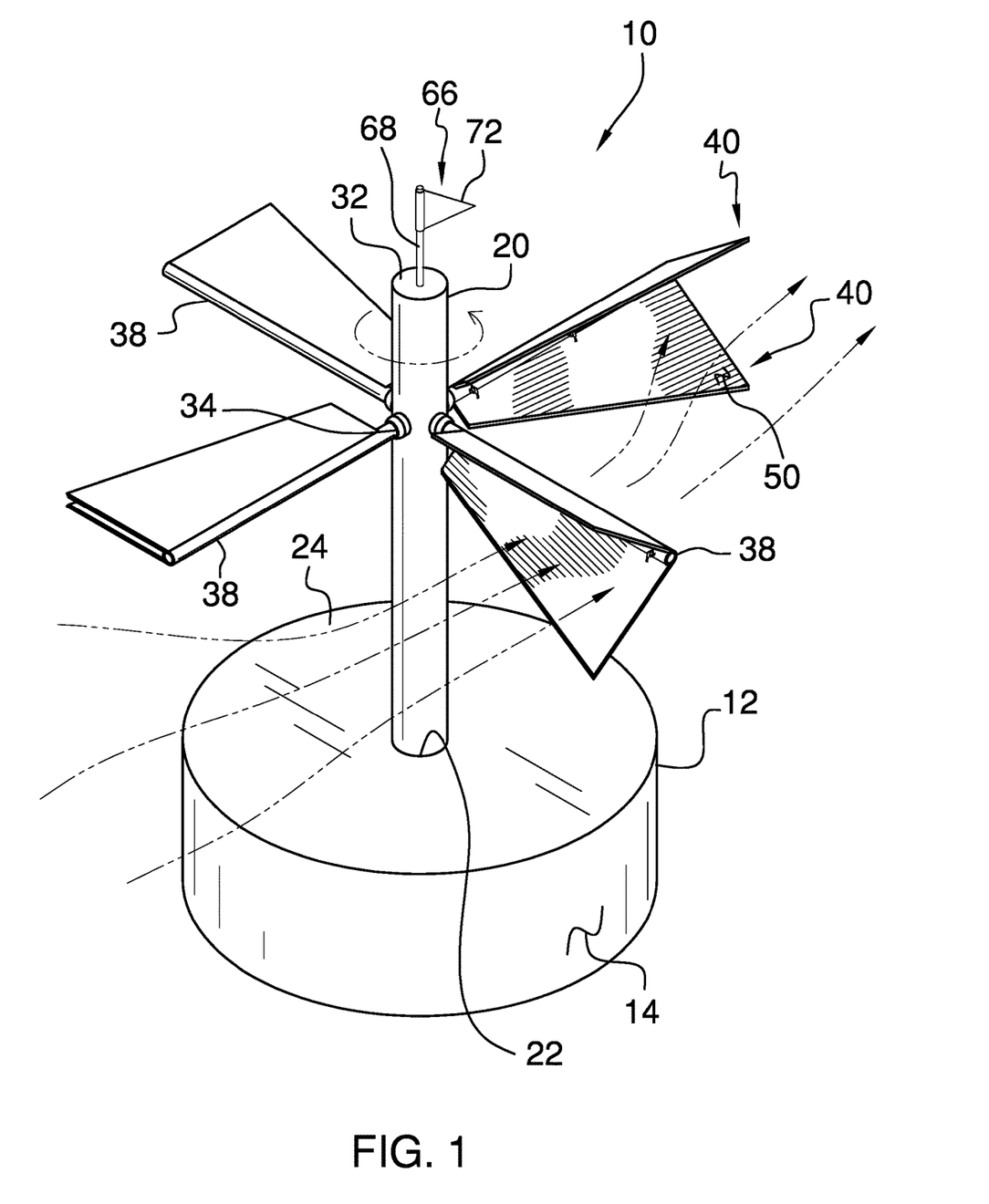
FIG. 1 is a top perspective view of a vertical wind turbine assembly according to an embodiment of the disclosure.
Figure 2:
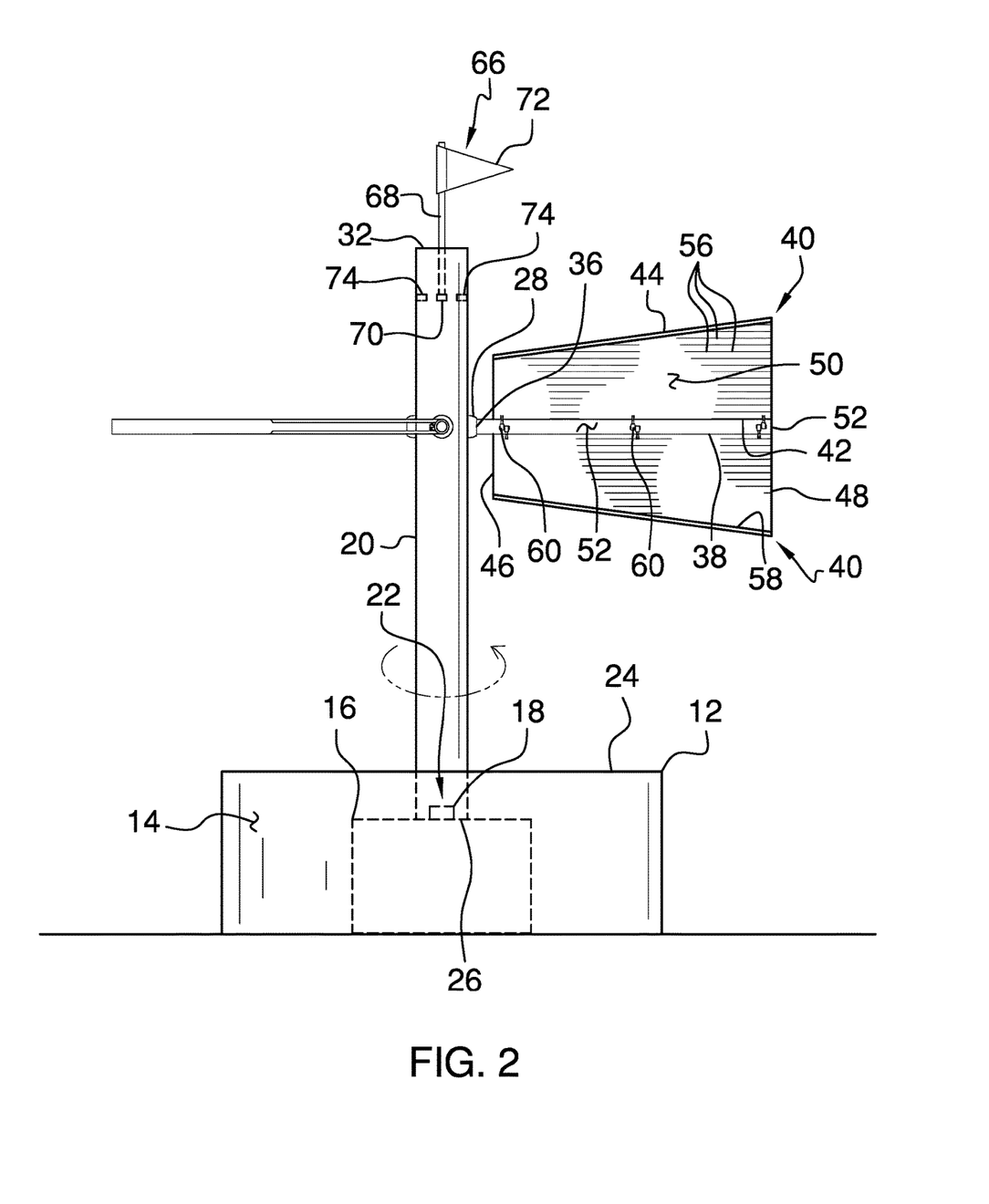
FIG. 2 is a front view of an embodiment of the disclosure.
Figure 3:
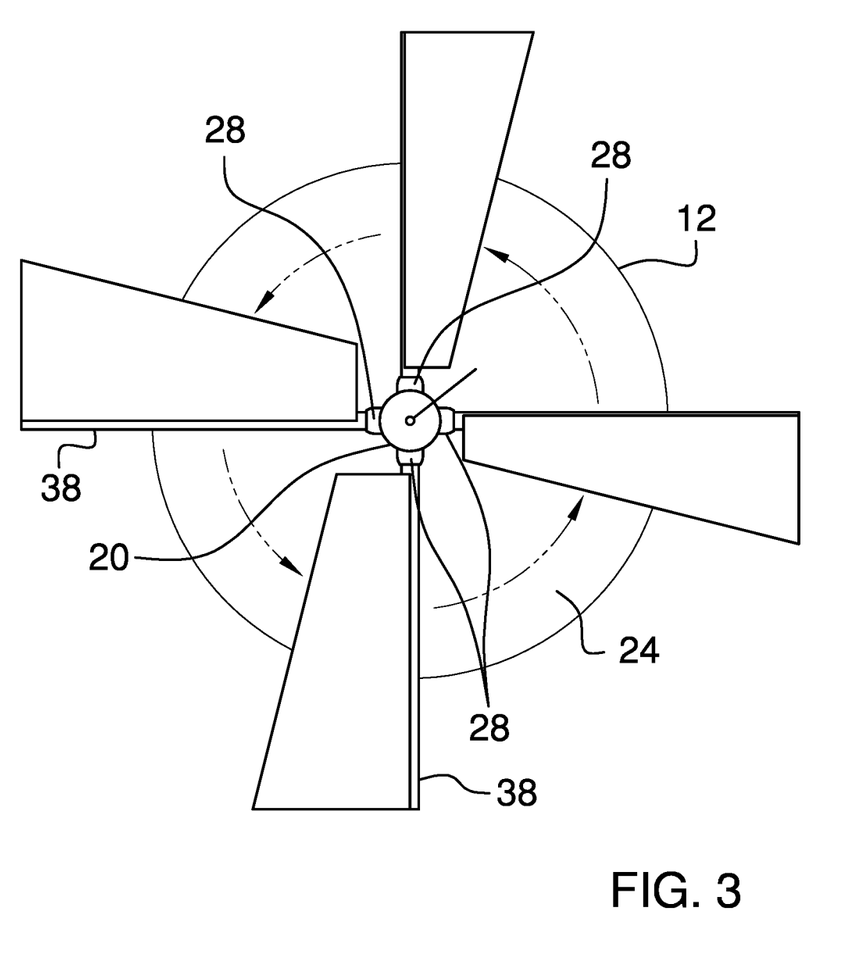
FIG. 3 is a top view of an embodiment of the disclosure.
Figure 4:
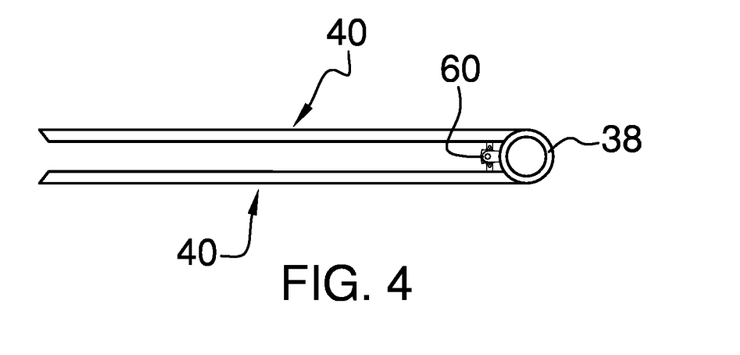
FIG. 4 is an end view of an arm and a set of blades in a stored position of an embodiment of the disclosure.
Figure 5:
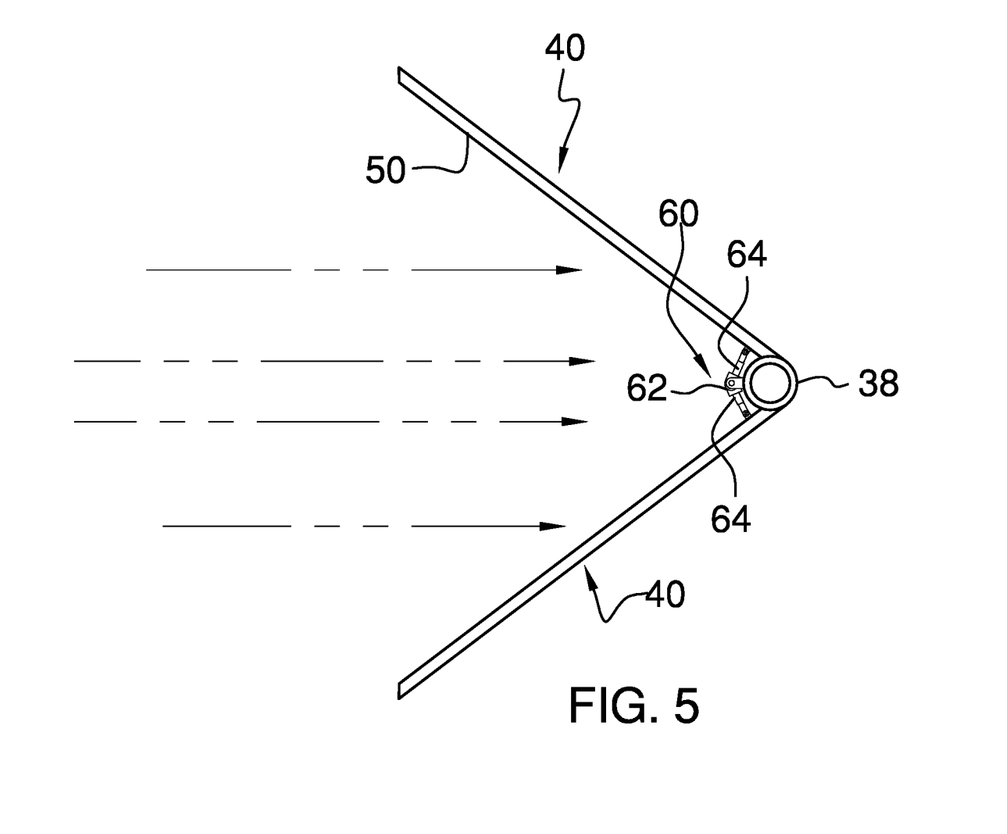
FIG. 5 is an end view of an arm and a set of blades in a deployed position of an embodiment of the disclosure.
Figure 6:
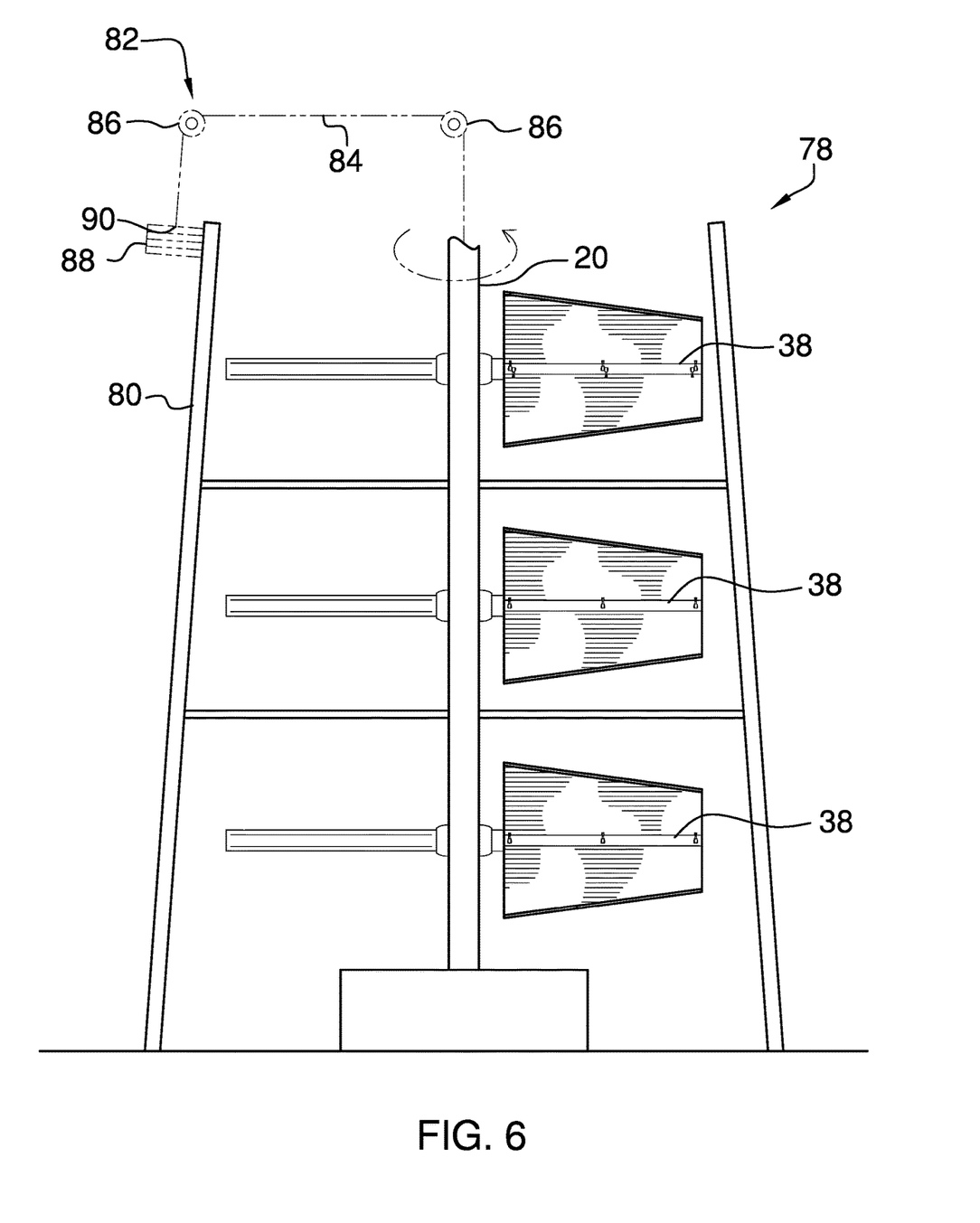
FIG. 6 is a perspective in-use view of an embodiment of the disclosure.
Figure 7:
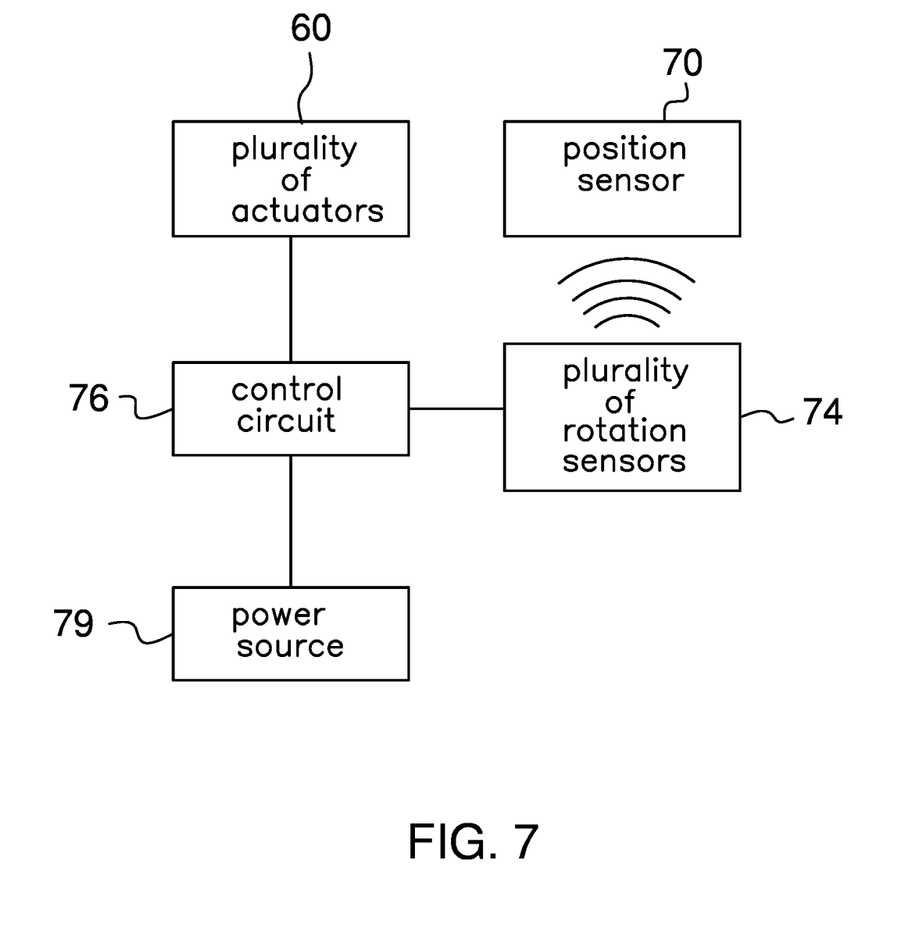
FIG. 7 is a schematic view of an embodiment of the disclosure.

In an alternative embodiment 78 as shown in FIG. 6, a series of arms 38 may be distributed along the length of the shaft 20 along with sets of blades on each of the series of arms. A cage 80 may be erected around the shaft 20 and a counterweight unit 82 may be attached to the cage 80. The counterweight unit 82 may include a cable 84, routed through pulleys 86, which is attached to the upper end 32 of the shaft 20 and a plurality of weights 88 on a distal end 90 of the cable 84 to offset the weight of the shaft 20.

In use, the wind direction sensor 66 is pointed in the direction of the wind and the set of blades 40 on each of the arms 38 is urged into the deployed position when the set of blades 40 is oriented perpendicular to the direction of the wind to facilitate the wind to rotate the shaft 20. Furthermore, the set of blades 40 on each of the arms 38 is urged into the stored position when the set of blades 40 is no longer oriented perpendicular to the direction of the wind to reduce the air friction of the set of blades 40 as the shaft 20 rotates. In this way the shaft 20 rotates the generator 16 to convert wind energy into electrical energy. Additionally, the generator 16 has a regenerative braking system that can slow the rotation of the shaft 20 in the event that the speed of rotation becomes dangerously high. Each of the sets of blades 40 is positioned relatively close to the shaft 20 thereby reducing the total space that the shaft 20 and plurality of blades 40 occupy. In this way the plurality of blades 40 are less likely to be struck by migrating birds thereby reducing the likelihood of killing or injuring wildlife.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A vertical wind turbine assembly for converting wind energy into electrical energy, said assembly comprising:
   a base being positioned on the ground in an area known to experience windy conditions;
   a generator being positioned within said base;
   a shaft being rotatably attached to said base, said shaft being mechanically coupled to said generator;
   a plurality of couplings, each of said plurality of couplings being attached to an outer surface of said shaft, said plurality of couplings being evenly spaced apart from each other and being distributed around a full circumference of said outer surface, said plurality of couplings being positioned closer to an upper end of said shaft than an upper wall of said base, each of said couplings having a well extending into a distal end of said couplings;
   a plurality of arms, each of said plurality of arms being attached to said shaft having said plurality of arms radiating outwardly from said shaft, each of said arms extends into said well in said distal end of a respective one of said couplings on said outer surface of said shaft;
   a plurality of sets of blades, each of said sets of blades being pivotally attached to a respective one of said plurality of arms, each of said sets of blades being positionable in a deployed position having each of said sets of blades angling away from said respective arm in opposing directions from each other wherein each of said sets of blades on each of said plurality of arms is configured to capture wind for rotating said shaft thereby turning said generator, each of said sets of blades being positionable in a stored position having said sets of blades parallel to each other wherein each of said sets of blades is configured to inhibit capturing the wind, each of said sets of blades has a coupled edge, a free edge, a first lateral edge and a second lateral edge, said first lateral edge having a length being greater than a length of said second lateral edge, said coupled edge of each of said sets of blades being pivotally attached to an exterior surface of said respective arm having each of said sets of blades extending along a substantial length of said respective arm, said coupled edge of each of said sets of blades is positioned on opposing sides of said exterior surface of said respective arm from each other, said first lateral edge of each of said sets of blades is positioned adjacent to a respective one of said couplings, said second lateral edge of each of said sets of blades is positioned adjacent to a distal end of said respective arm;
   a plurality of actuators, each of said plurality of actuators being coupled between a respective one of said plurality of arms and a respective one of said plurality of sets of blades, each of said plurality of actuators urging said respective sets of blades between said deployed position and said stored position; and
   a wind direction sensor being integrated into said shaft wherein said wind direction sensor is configured to be exposed to wind, said wind direction sensor being rotated to indicate a direction of the wind, said wind direction sensor being in communication with each of said plurality of actuators, each of said plurality of actuators being actuated to urge said respective blades between said deployed position and said stored position depending on the direction of wind.

2. The assembly according to claim 1, wherein:
   said generator has a drive input; and
   said shaft extends through a hole in an upper wall of said base such that said shaft is vertically oriented on said base, a lower end of said shaft being coupled to said drive input of said generator.

3. The assembly according to claim 1, wherein each of said plurality of actuators includes a pivot and a pair of pistons each attached to said pivot, said pivot associated with each of said actuators being attached to said exterior surface of said respective arm, each of said pair of pistons extending between said pivot and a lower surface of said respective blade.

4. The assembly according to claim 3, wherein:
   each of said pistons shortens to urge said respective set of blades into said stored position; and
   each of said pistons lengthens to urge said respective set of blades into said deployed position.

5. The assembly according to claim 1, wherein said wind direction sensor comprising:
   a pole being rotatably disposed on an upper end of said shaft;
   a position sensor being attached to said pole such that said position sensor is positioned within said shaft; and
   a flag being attached to said pole wherein said flag is configured to capture the wind thereby rotating said pole.

6. The assembly according to claim 5, wherein said wind direction sensor includes:
   a plurality of rotation sensors, each of said rotation sensors being integrated into said shaft, each of said rotation sensors being aligned with a respective one of said arms, each of said plurality of rotation sensors passing next to said position sensor as said shaft rotates; and
   a control circuit being integrated into said shaft, said control circuit being electrically coupled to said each of said plurality of rotation sensors, said control circuit being electrically coupled each of said pistons associated with each of said actuators, each of said pistons associated with said plurality of actuators associated with a respective one of said arms being actuated into said lengthened condition when said rotation sensor associated with said respective arm moves within a pre-determined distance of said position sensor, each of said pistons associated with each of said actuators associated with said respective arm being actuated into said shortened condition when said rotation sensor associated with said respective arm moves beyond said pre-determined distance of said position sensor.

7. A vertical wind turbine assembly for converting wind energy into electrical energy, said assembly comprising:

a base being positioned on the ground in an area known to experience windy conditions;

a generator being positioned within said base, said generator having a drive input;

a shaft being rotatably attached to said base, said shaft being mechanically coupled to said generator, said shaft extending through a hole in an upper wall of said base such that said shaft is vertically oriented on said base, a lower end of said shaft being coupled to said drive input of said generator;

a plurality of couplings, each of said plurality of couplings being attached to an outer surface of said shaft, said plurality of couplings being evenly spaced apart from each other and being distributed around a full circumference of said outer surface, said plurality of couplings being positioned closer to an upper end of said shaft than said upper wall of said base, each of said couplings having a well extending into a distal end of said couplings;

a plurality of arms, each of said plurality of arms being attached to said shaft having said plurality of arms radiating outwardly from said shaft, each of said arms extending into said well in said distal end of a respective one of said couplings on said outer surface of said shaft;

a plurality of sets of blades, each of said sets of blades being pivotally attached to a respective one of said plurality of arms, each of said sets of blades being positionable in a deployed position having each of said sets of blades angling away from said respective arm in opposing directions from each other wherein each of said sets of blades on each of said plurality of arms is configured to capture wind for rotating said shaft thereby turning said generator, each of said sets of blades being positionable in a stored position having said sets of blades lying flat against parallel to each other wherein each of said sets of blades is configured to inhibit capturing the wind, each of said sets of blades having a coupled edge, a free edge, a first lateral edge and a second lateral edge, said first lateral edge having a length being greater than a length of said second lateral edge, said coupled edge of each of said sets of blades being pivotally attached to an exterior surface of said respective arm having each of said sets of blades extending along a substantial length of said respective arm, said coupled edge of each of said sets of blades being positioned on opposing sides of said exterior surface of said respective arm from each other, said first lateral edge of each of said sets of blades being positioned adjacent to a respective one of said couplings, said second lateral edge of each of said sets of blades being positioned adjacent to a distal end of said respective arm;

a plurality of actuators, each of said plurality of actuators being coupled between a respective one of said plurality of arms and a respective one of said plurality of sets of blades, each of said plurality of actuators urging said respective sets of blades between said deployed position and said stored position, each of said plurality of actuators includes a pivot and a pair of pistons each attached to said pivot, said pivot associated with each of said actuators being attached to said exterior surface of said respective arm, each of said pair of pistons extending between said pivot and a lower surface of said respective blade, each of said pistons being actuatable into a shortened condition to urge said respective set of blades into said stored position, each of said pistons being actuatable into a lengthened condition to urge said respective set of blades into said deployed position; and a wind direction sensor being integrated into said shaft wherein said wind direction sensor is configured to be exposed to wind, said wind direction sensor being rotated to indicate a direction of the wind, said wind direction sensor being in communication with each of said plurality of actuators, each of said plurality of actuators being actuated to urge said respective blades between said deployed position and said stored position depending on the direction of wind, said wind direction sensor comprising:

a pole being rotatably disposed on said upper end of said shaft;

a position sensor being attached to said pole such that said position sensor is positioned within said shaft;

a flag being attached to said pole wherein said flag is configured to capture the wind thereby rotating said pole;

a plurality of rotation sensors, each of said rotation sensors being integrated into said shaft, each of said rotation sensors being aligned with a respective one of said arms, each of said plurality of rotation sensors passing next to said position sensor as said shaft rotates; and a control circuit being integrated into said shaft, said control circuit being electrically coupled to said each of said plurality of rotation sensors, said control circuit being electrically coupled each of said pistons associated with each of said actuators, each of said pistons associated with said plurality of actuators associated with a respective one of said arms being actuated into said lengthened condition when said rotation sensor associated with said respective arm moves within a pre-determined distance of said position sensor, each of said pistons associated with each of said actuators associated with said respective arm being actuated into said shortened condition when said rotation sensor associated with said respective arm moves beyond said pre-determined distance of said position sensor.

* * * * *